July 29, 1958      B. D. LEETE      2,845,595

APPARATUS FOR MEASURING ELECTRICAL QUANTITIES

Filed Dec. 6, 1952      5 Sheets-Sheet 1

Inventor:
Bernard D. Leete,
by Richard E. Hosley
His Attorney.

July 29, 1958  B. D. LEETE  2,845,595
APPARATUS FOR MEASURING ELECTRICAL QUANTITIES
Filed Dec. 6, 1952  5 Sheets-Sheet 2

Inventor:
Bernard D. Leete,
by Richard E. Hosley
His Attorney.

Fig. 5.

July 29, 1958 B. D. LEETE 2,845,595
APPARATUS FOR MEASURING ELECTRICAL QUANTITIES
Filed Dec. 6, 1952 5 Sheets-Sheet 4

Fig. 6.

Inventor:
Bernard D. Leete,
by Richard E. Hosley
His Attorney.

July 29, 1958 B. D. LEETE 2,845,595
APPARATUS FOR MEASURING ELECTRICAL QUANTITIES
Filed Dec. 6, 1952 5 Sheets-Sheet 5

Inventor:
Bernard D. Leete,
by Richard E. Hosley
His Attorney.

United States Patent Office 2,845,595
Patented July 29, 1958

2,845,595
APPARATUS FOR MEASURING ELECTRICAL QUANTITIES

Bernard D. Leete, Peabody, Mass., assignor to General Electric Company, a corporation of New York Application December 6, 1952, Serial No. 324,543

20 Claims. (Cl. 324—.5)

My invention relates to improved, high precision apparatus for measuring electrical quantities, such as voltage or current, based upon magnetic resonance phenomena.

A brief description of magnetic resonance theory will aid the explanation of my invention. More complete treatments of the theory may be found in texts on atomic physics and in numerous articles which have appeared in scientific and technical publications. It will be understood that the theoretical matter presented here is for illustrative purposes only, and is not intended to limit the scope of my invention.

It is known that the nuclei of many atoms have an angular momentum, or spin, and likewise have a magnetic moment. When such nuclei are placed in a magnetic field, their magnetic moments tend to precess about the field direction at a rate known as the Larmor frequency, the value of which is given by the relation $2\pi v = \gamma H$ where $v$ is the Larmor, or precession, frequency, H is the magnetic field intensity, and $\gamma$ is a quantity known as the gyromagnetic ratio which is proportional to the quotient of the magnetic moment of the nucleus divided by its angular momentum. For any one given kind of atomic nucleus, the gyromagnetic ratio is a constant, so that the Larmor frequency is directly proportional to the magnetic field intensity. The nuclei of 26 or more kinds of atoms and isotopes are known to have magnetic moments which precess in this manner. For simplicity in the following discussion, the proton, or hydrogen nucleus, will be considered as a typical example, but my invention is not limited to the use of protons, since other nuclei may be used without materially altering the principles involved.

Chemical bonds appear to have no appreciable effect upon the Larmor frequency. Consequently, the protons used in magnetic resonance apparatus may be hydrogen nuclei in any convenient chemical combination—for example, ordinary water. However, in practice small quantities of other substances, such as manganous sulphate or other paramagnetic salts, are often dissolved in the water for well-known reasons having to do with the "relaxation time," which need not be discussed to explain the present invention. A $\frac{1}{250}$ molar solution of manganous sulphate in one cc. of distilled water has been employed with good results as a proton sample in magnetic resonance equipment.

The gyromagnetic ratio $\gamma$ of the proton is approximately $2.67 \times 10^4$ per oersted-second. Thus, the Larmor frequency of proton precession in a magnetic field of H oersteds is $$\frac{2.67}{2\pi} \times 10^4 \times H$$

cycles per second. For example, if H is 1000 oersteds, the Larmor frequency is approximately 4.25 megacycles per second.

Assume that a large number of protons are placed in a homogeneous, unidirectional magnetic field, so that the magnetic moments precess about the field direction at the Larmor frequency. Considering the geometric projections of the proton magnetic moments on the field direction, it will be found that two orientations of the protons exist: some of the protons have their magnetic moments aligned with the field, which is called the parallel orientation, while others have their magnetic moments aligned against the field, which is called the anti-parallel orientation. The anti-parallel orientation represents a higher energy level than the parallel orientation, since work must be done to turn the magnetic moments against the field. However, at temperatures normally encountered, the energy difference between the two orientations is very small compared to the energy of thermal agitation.

Because of the thermal effects, frequent transitions of individual nuclei from one orientation to the other occur, but if the protons are in thermal equilibrium, it is known that the probability as a function of time for a transition from the higher energy level to the lower energy level is slightly greater than the probability for the reverse transition, so that, under such conditions, on the average a slightly larger number of protons will be found in the lower-energy parallel orientation than in the higher-energy anti-parallel orientation. For example, of 2,000,000 protons in thermal equilibrium at room temperature, 1,000,007 may have the parallel orientation, while the remainder have the anti-parallel orientation.

Assume that a second magnetic field is introduced at right angles to the first field, and that the second field alternates at the Larmor frequency of the protons precessing in the first field. Now those protons having the low-energy parallel orientation can absorb energy from the alternating field, which increases the probability of transitions from the parallel orientation to the higher-energy anti-parallel orientation and thus tends to equalize the numbers of protons in the two energy levels. If the alternating field is sufficiently strong, the proton populations in the two energy levels soon become substantially equal, and no more energy is absorbed. But if the alternating field is a bit weaker, the absorption of energy by the protons from the alternating field may be balanced by their tendency to return to thermal equilibrium, so that there can be substantially continuous absorption of energy from the alternating field. Therefore, there is an optimum strength of the alternating field, which can be determined by experimental adjustment, at which maximum energy is absorbed by the protons. Although quantum considerations prohibit more than two orientations of protons in a magnetic field, other nuclei may have as many as 10 possible orientations. This does not affect the basic principles involved, since transitions may still take place between adjacent energy levels represented by different orientations.

This absorption of energy by precessing nuclei, which generally occurs only when the frequency of the alternating field is substantially the same as the Larmor frequency of the nuclei, is called nuclear magnetic resonance. Similar phenomena, known as electronic magnetic resonance, can occur in substances having uncoupled electrons. In general, there are two classes of such substances, one class being strongly paramagnetic salts, and the other class being ferromagnetic metals and alloys.

For electronic magnetic resonance in paramagnetic salts, sometimes called paramagnetic resonance, the same relations apply as in proton resonance, except that the gyromagnetic ratio of the electron is used in place of the gyromagnetic ratio of the proton. Since the electron has a gyromagnetic ratio which is about 700 times as large as that of the proton, the Larmor frequency for paramagnetic resonance is about 700 times as great as that for proton resonance in the same magnetic field.

In ferromagnetic metals and alloys, the magnetic induction B inside the metal is not substantially equal to the magnetic field intensity H. In this electronic resonance case, sometimes called ferromagnetic resonance, the Larmor frequency $v$ is given by the relation $2\pi v = \gamma\sqrt{BH}$, where $\gamma$ is the gyromagnetic ratio of the electron, H is the magnetic field intensity, and B represents the magnetic induction which is equal to the product of the magnetic field intensity and the permeability of the metal. The present invention may utilize either nuclear magnetic resonance or electronic magnetic resonance. The generic term "magnetic resonance" includes both. Since the basic principles are the same, only nuclear resonance need be discussed in detail.

The magnetic resonance phenomenon can be detected by various means, several of which are well known. For example, assume that the alternating field is supplied by a suitably energized coil placed around the proton sample, which is a common arrangement in nuclear resonance apparatus. Energy absorption from the field by the protons at resonance causes a measurable decrease in the apparent "Q" of the coil, where Q is the well-known symbol for the ratio of energy stored per cycle to energy dissipated per cycle. This is known as the absorption effect. There is also a small, but measurable, change in the apparent inductance of the coil. This is known as the dispersion effect. Furthermore, when a second coil is placed near the proton sample with its axis orthogonal to the respective directions of the two applied magnetic fields, at resonance the precessing proton magnetic moments induce an alternating voltage in the second coil. This is known as the induction effect. While any of these three effects may be used to detect the existence of magnetic resonance conditions, in practice the absorption and induction effects are most frequently used.

Magnetic resonance provides a means for measuring magnetic fields with great precision, since the magnetic resonance frequency is precisely related to the magnetic intensity, and means for precise frequency measurements are well known. It will be appreciated that this phenomenon can also be used to measure electrical quantities, such as current or voltage, by first producing a magnetic field proportional to the measured quantity and then measuring this field. However, for precise measurements of this type, difficulties arise from other factors which also affect the field intensity, such as stray magnetic fields and the effects of temperature changes on magnetic circuits. Magnetic shielding, temperature control, and the like, may reduce but not eliminate these difficulties.

The chief objects of my invention are to provide improved apparatus for measuring electrical quantities, having greater precision and stability than can be obtained by means heretofore commonly employed, and to minimize difficulties due to external factors such as stray magnetic fields and temperature variations. Other objects and advantages will appear as the description proceeds.

Briefly stated, according to one aspect of my invention, I provide two similar magnetic circuits which are differently affected by the measured quantity, but are similarly affected by other factors. Thus, two magnetic fields are provided having magnetic intensities which differ substantially only as a function of the quantity to be measured. This difference in the magnetic intensities is measured by nuclear resonance means.

My invention will be better understood from the following description taken in connection with the accompanying drawings, and its scope will be pointed out in the appended claims. In the drawings.

Figure 1:
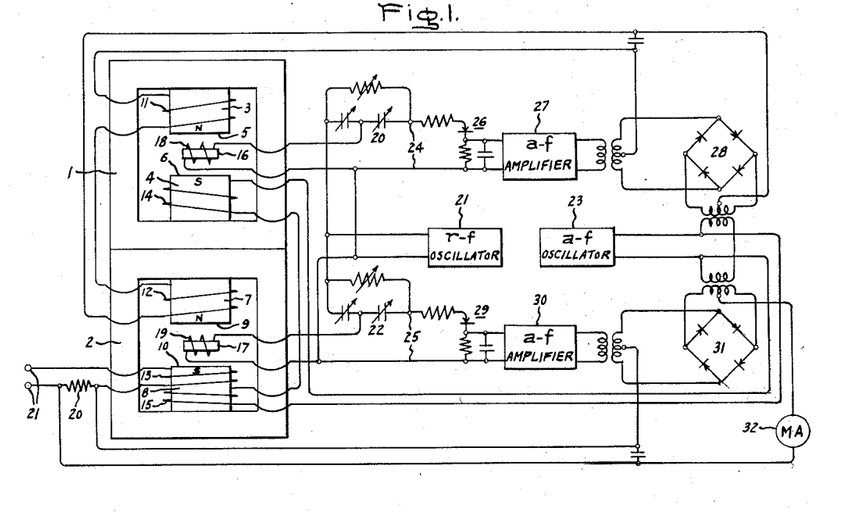
Fig. 1 is a schematic representation of apparatus embodying principles of my invention for measuring voltage.

Referring now to Fig. 1 of the drawings, a magnetic structure is provided which comprises two similar parts, or circuits, 1 and 2. Each of these parts may be a three-legged magnetic core having a gap in the center leg, as shown, or alternatively the magnetic structure may be of other forms, two of which are described later in connection with Figs. 6 through 8. Preferably, the center leg of part 1 comprises two permanent magnets 3 and 4 which provide a north pole at 5 and a south pole at 6. Likewise, the center leg of part 2 comprises two permanent magnets 7 and 8 which provide a north pole at 9 and a south pole at 10. Thus, magnetic fields are provided across the two gaps, and the parts 1 and 2 being similar in all respects, the magnetic intensities provided in the respective gaps by the permanent magnets are equal. Windings are also provided which, when energized, change these magnetic intensities as hereinafter explained. The windings 11 and 12, connected in series, are arranged to provide equal changes in the two magnetic intensities, while the winding 13 is arranged to change the magnetic intensity in the lower gap only, and thus to make the two magnetic intensities unequal. Windings 14 and 15 are modulating windings, the purpose of which is explained later.

Magnetic resonance samples 16 and 17 are located within respective gaps of the magnetic structure, as shown. If proton resonance is to be utilized, the samples 16 and 17 may be small glass tubes filled with water and sealed at the ends, or other suitable containers may be used. Coils 18 and 19 are placed about the respective samples with the coil axes perpendicular to the magnetic fields across the magnetic gaps. These coils are energized at a radio frequency, as hereinafter explained, to provide magnetic resonance conditions in the two samples 16 and 17.

Coils 18 and 19 are energized at the same, substantially constant, frequency. Therefore, magnetic resonance occurs in samples 16 and 17 at the same values of magnetic intensity. Current is supplied to windings 11 and 12, as hereinafter explained, to keep the average magnetic intensity within sample 16 substantially at the magnetic resonance value. Consequently, the average magnetic intensity within sample 17 is also at the magnetic resonance value when winding 13 is de-energized. But when current flows through winding 13, the magnetic intensity within sample 17 departs from the resonance value. Since the parts 1 and 2 are identical and close together, external factors such as stray magnetic fields affect both magnetic intensities equally, and are automatically compensated by changes in the current through windings 11 and 12. Also, parts 1 and 2 are preferably in good thermal contact, so that temperature variations affect both magnetic circuits equally, and are likewise compensated.

A resistor 20 is connected in series with winding 13 as shown. The voltage to be measured is applied to terminals 21, and thus is applied across winding 13 and resistor 20 in series. This voltage tends to provide current through winding 13, which thus tends to change the average magnetic intensity in sample 17 from the resonance value. As hereinafter explained, current is provided through resistor 20 to maintain the resonance conditions. This requires that the voltage drop across resistor 20 be substantially equal and opposed to the measured voltage. In this way, a current is provided which is proportional to the voltage measured. Since the measured voltage is balanced by an equal and opposed voltage, very little current is drawn from the circuit which supplies the measured voltage.

Coil 18 is connected in a bridge circuit 20 energized by a radio-frequency oscillator 21, so that coil 18 is energized at the frequency supplied by oscillator 21. Similarly, coil 19 is connected in a bridge circuit 22 which is also energized by oscillator 21. The bridge circuits shown are of the well-known bridged-T type, but it will be appreciated that many other types of bridge circuit can be used satisfactorily.

To aid in detecting magnetic resonance conditions, windings 14 and 15 are energized by audio-frequency current supplied, for example, by audio-frequency oscillator 23. Thus the magnetic intensities in the two gaps are modulated at an audio-frequency, and magnetic resonance conditions are exactly satisfied only twice during each audio-frequency cycle.

At magnetic resonance, the samples 16 and 17 absorb energy from the radio-frequency magnetic field, and thus increase the apparent resistances of coils 18 and 19 respectively. Assume, for example, that bridges 20 and 22 are adjusted to balance when there is no magnetic resonance absorption of energy. When balanced, the bridged-T circuits have zero transfer admittance, and there is no radio-frequency signal across the output terminals 24 and 25 of the respective bridge circuits. At magnetic resonance, the increase in apparent resistance of the coils unbalances the bridges, and radio-frequency signals appear at the bridge output terminals. Thus, as the magnetic intensities alternate through the resonant values, radio-frequency signals are obtained at terminals 24 and 25 which are amplitude modulated at the fundamental and harmonic frequencies of audio-frequency oscillator 23. In practice, it is not essential that the bridge circuits be precisely balanced—in fact, some unbalance is often desirable.

It can be shown that the signal at terminals 24 has no fundamental-frequency modulation component when the average magnetic intensity in sample 16 is precisely at the magnetic resonance value. But there is a fundamental-frequency modulation component when the average magnetic intensity differs slightly from the resonance value, and the phase of this modulation component depends upon whether the average magnetic intensity is above or below the resonance value. Thus, the fundamental-frequency modulation component of the signal at terminals 24 is related in magnitude and phase to the degree and direction of departure from magnetic resonance conditions within sample 16. This signal is demodulated by any suitable means, such as the rectifier-demodulator 26, and amplified by audio-frequency amplifier 27, to provide an audio-frequency error signal related in value to departures from magnetic resonance conditions in sample 16. The error signal is applied to a phase-sensitive detector 28 of a well-known type. Detector 28 provides through windings 11 and 12 a direct current having a magnitude and direction which depend upon the amplitude and phase of the amplified error signal. This direct current energizes windings 11 and 12 to change the average magnetic intensity within the two samples, and to keep the average magnetic intensity within sample 16 substantially at the magnetic resonance value.

In a similar way, the signal at terminals 25 is demodulated by the rectifier-demodulator 29 and amplified by audio frequency amplifier 30 to provide an audio-frequency error signal which is applied to a phase-sensitive detector 31. Detector 31 supplies a direct current through resistor 20, which controls the current through winding 13 to keep the average magnetic intensity in sample 17 substantially at the magnetic resonance value. Thus, magnetic resonance conditions are automatically maintained in both of the magnetic resonance samples. For this to be true, there must be little, if any, current through winding 13. Therefore, the voltage drop across resistor 20 must be substantially equal and opposed to the measured voltage applied across terminals 21. Consequently, the current through resistor 20 is proportional to the measured voltage. This current may be measured by a milliammeter 32, or any other suitable current measuring device, or may be used for control or other purposes.

Figure 2:
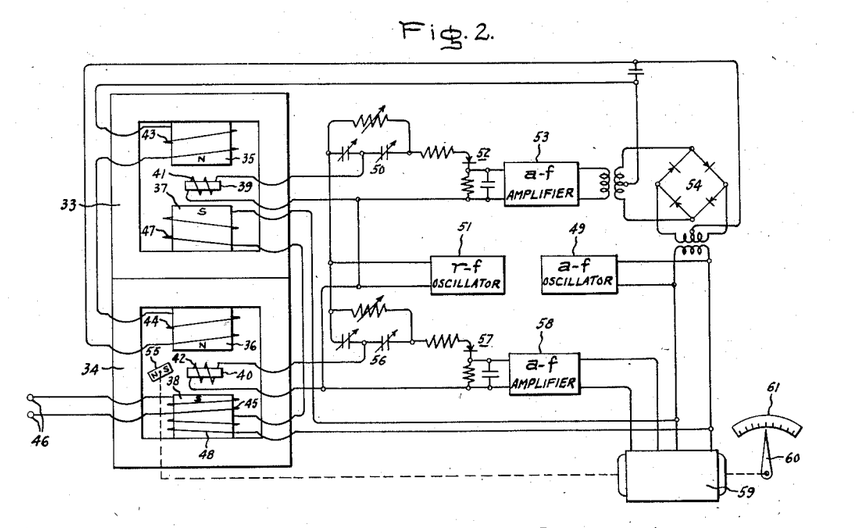
Fig. 2 is a schematic representation of an embodiment for measuring electric current.

Fig. 2 shows apparatus useful for measuring electric current. A magnetic structure comprises two similar parts 33 and 34 each provided with a gap as shown. The structure includes permanent magnet means for providing north poles at 35 and 36 and south poles at 37 and 38 so that the permanent magnets produce equal magnetic fields across the two gaps. Magnetic resonance samples 39 and 40 are positioned in the respective gaps as shown, and coils 41 and 42 are arranged about the respective samples with the coil axes perpendicular to the magnetic fields across the gap. Windings 43 and 44, connected in series, are arranged to provide, when energized, equal changes in the magnetic intensities within the two gaps. Winding 45 is arranged to change the magnetic intensity in the lower gap only, and thus to make the two magnetic intensities unequal when winding 45 is energized. The current to be measured is applied to winding 45 through terminal 46. Modulating windings 47 and 48 are energized at an audio frequency by suitable means such as audio-frequency oscillator 49.

Coil 41 is connected in a bridge circuit 50 energized by a radio-frequency oscillator 51. The output of the bridge circuit is demodulated by a rectifier-demodulator 52, and amplified by audio-frequency amplifier 53. The resulting audio-frequency error signal is applied to a phase sensitive detector 54. Detector 54 supplies direct current to windings 43 and 44 automatically to keep the average magnetic intensities in sample 39 at the magnetic resonance value, as hereinbefore explained in connection with Fig. 1. This neutralizes the effects of external factors, such as stray magnetic fields and temperature variations.

A small permanent magnet 55 is adjustably positioned adjacent to part 34, and changes the magnetic intensity within the lower gap by an amount related to the magnet position. For example, magnet 55 may be rotatable about its center. It produces maximum effect upon the magnetic field across the lower gap when it is aligned with this field, and produces minimum effect when it is aligned perpendicular to this field. Thus, magnet 55 provides means for producing unequal changes in the magnetic intensities within the two gaps, to oppose the inequality produced by the measured current flowing through winding 45. In operation, as hereinafter explained, the position of magnet 55 is adjusted automatically to keep the average magnetic intensity in sample 40 substantially at the magnetic resonance value. Consequently, the position of magnet 55 is related to the value of the current measured.

Coil 42 is connected in a bridge circuit 56 energized by radio-frequency oscillator 51. The output of this bridge circuit is demodulated by rectifier-demodulator 57, and amplified by audio frequency amplifier 58. The resulting and audio-frequency error signal is applied to the control winding of a two-phase induction servomotor 59. The field winding of servomotor 59 is energized by connections to audio-frequency oscillator 49, so that motor 59 rotates in the direction which depends upon the phase of the error signal provided by amplifier 58. Amplifier 59 is connected, through suitable speed reducing gears which may be contained within the motor housing, to magnet 55, so that the motor automatically adjusts the position of magnet 55 to maintain magnetic resonance conditions within sample 40. The position of magnet 55, which is related to the value of the measured current, may be indicated by any suitable means, such as a pointer 60 connected to the same shaft as magnet 55 and cooperating with a calibrated scale 61. If desired, any other indicating, recording, or control mechanism actuated by a shaft position can be employed in place of, or in addition to, the pointer 60 and scale 61.

In the embodiments thus far described, it will be noted that one magnetic resonance system serves as a reference to compensate for external factors, while another magnetic resonance system provides indications related to the measured variable. This arrangement is especially useful when several variables are to be measured, since one reference system may compensate for the external factors in several measurement systems. For example, assume that measurement of a voltage and a current are desired. A magnetic structure having three similar parts can be employed, with three gaps each containing a magnetic resonance sample. Magnetic resonance apparatus associated with one of these samples may compensate the magnetic structure for the effects of external factors, in the same manner as in the apparatus hereinbefore described. Magnetic resonance apparatus associated with the second of the three samples can provide indications of measured voltage values, as in the Fig. 1 apparatus, while magnetic resonance apparatus associated with the third of the three samples can provide indications of current values, as in the Fig. 2 apparatus. It is obvious that other combinations can be arranged to measure a plurality of voltages, or a plurality of current, or a plurality of any electrical quantities which can be converted to magnetomotive forces by means of suitably energized windings.

Figure 3:
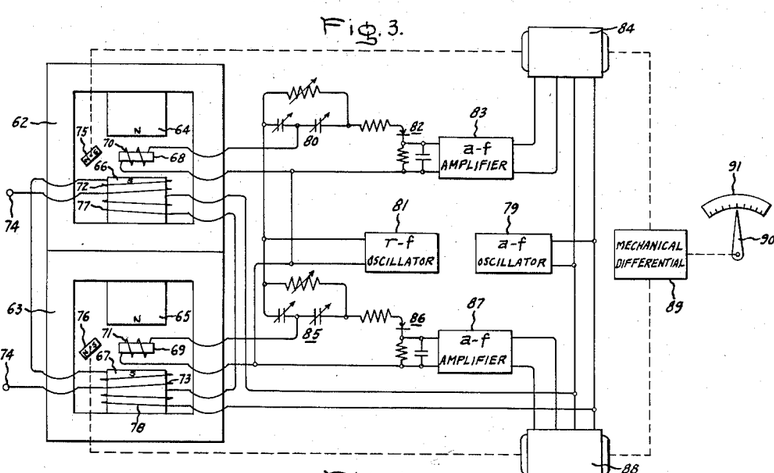
Fig. 3 is a schematic representation of another embodiment for measuring electric current.

Fig. 3 shows an arrangement in which two magnetic resonance systems are oppositely affected by the measured current. A magnetic structure comprises two similar parts 62 and 63 including permanent magnet means providing north poles at 64 and 65 and south poles at 66 and 67. Magnetic resonance samples 68 and 69 are located in the two gaps as shown, and about these two samples are coils 70 and 71. Windings 72 and 73, connected in series, are arranged to provide, when energized, opposite changes in the magnetic intensities within the two samples; that is, current flowing through windings 72 and 73 in series increases the magnetic intensity within one of the two gaps and decreases the magnetic intensity within the other gap. The current to be measured is applied to windings 72 and 73 through terminals 74.

A permanent magnet 75 is adjustably positioned with respect to part 62, and another permanent magnet 76 is adjustably positioned with respect to part 63. As hereinafter explained, the position of magnet 75 is adjusted automatically to maintain magnetic resonance conditions in sample 68, and the position of permanent magnet 76 is adjusted automatically to maintain magnetic resonance conditions in sample 69. External factors, such as stray fields and temperature variations, produce equal changes in the positions of the two magnets. The measured current, on the other hand, tends to produce opposite changes in the magnetic intensities within the two gaps, and thus produces opposite changes in the positions of the two magnets 75 and 76. The difference between the positions of these two magnets therefore is related to the value of the measured current.

Modulating windings 77 and 78 are energized at an audio frequency by suitable means, such as audio-frequency oscillator 79. Coil 70 is connected in a bridge circuit 80 energized by radio-frequency oscillator 81. The bridge circuit output is demodulated by rectifier demodulator 82, then amplified by audio-frequency amplifier 83 and applied to the control winding of a two-phase induction servomotor 84. Motor 84 is connected, through suitable speed reducing gears, to adjust the angular position of magnet 75.

Similarly, coil 71 is connected in a bridge circuit 85 also energized by oscillator 81. The output of this bridge circuit is demodulated by rectifier demodulator 86, amplified by audio-frequency amplifier 87, and then applied to the control winding of a two-phase induction servomotor 88. Motor 88 is connected to adjust the angular position of magnet 76. The difference between the respective angular positions of the two magnets 75 and 76 is indicated by suitable means, such as a mechanical differential 89 which positions a pointer 90 in accordance with such difference. Pointer 90 cooperates with a suitably calibrated scale 91.

Figure 4:
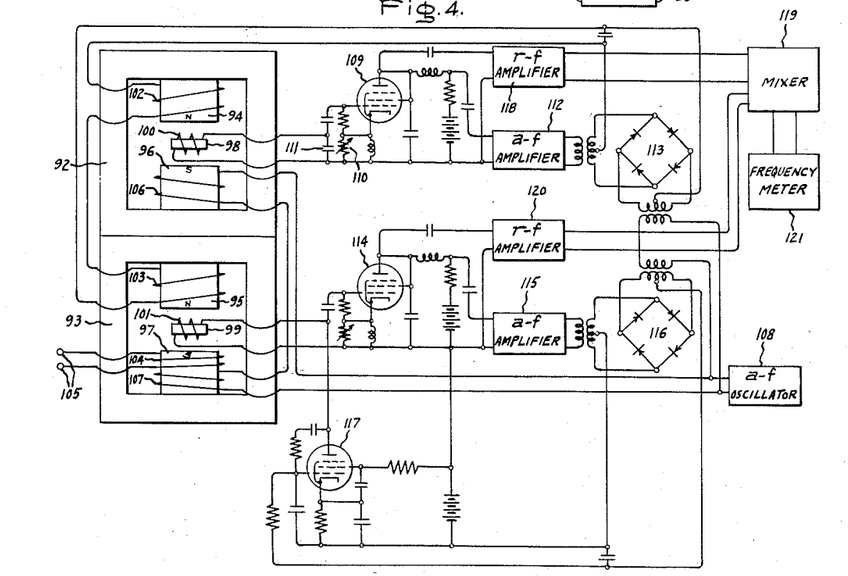
Fig. 4 is a schematic representation of still another embodiment for measuring electric current.

Fig. 4 shows another form of apparatus for measuring electric current. The magnetic structure comprises two similar parts 92 and 93 including permanent magnet means providing north poles at 94 and 95 and south poles at 96 and 97. Magnetic resonance samples 98 and 99 are located in the respective gaps as shown. Coils 100 and 101 are positioned about the respective samples with the coil axes perpendicular to the magnetic field across the respective gaps. Windings 102 and 103, connected in series, are arranged to provide equal changes in the respective magnetic intensities within the two gaps. A winding 104 is arranged to change the magnetic intensity in the lower gap only, and thus make the two magnetic intensities unequal. The current to be measured is applied to winding 104 through terminals 105. Modulating windings 106 and 107 are energized at an audio frequency by suitable means such as audio-frequency oscillator 108.

Coil 100 is energized by connection in circuit with a radio frequency-oscillator 109. Oscillator 109 may be a grid-biased regenerative detector type with its feedback resistor 110 preferably adjusted so that oscillations are just maintained. The frequency of oscillation is determined by the impedance of coil 100 and the value of capacitor 111. The amplitude of oscillations is a function of the energy dissipated in coil 100, so that when energy is absorbed by sample 98 at magnetic resonance, the amplitude of oscillation decreases. Since the grid bias of the oscillator tube depends upon the amplitude of the oscillations, due to the grid bias arrangement, the tube conducts more current under magnetic resonance conditions than it does when conditions differ slightly from the magnetic resonance value. Consequently, as the magnetic intensity is modulated at an audio-frequency through the resonance value, the current conducted by the oscillator tube varies at an audio rate, thus providing an audio-frequency signal the phase of which depends upon whether the average magnetic intensity in sample 98 is above or below the magnetic resonance value. This audio-frequency signal is amplified by audio-frequency amplifier 112, and is then applied to a phase-sensitive detector 113. Detector 113 supplies direct current to windings 102 and 103 to keep the average magnetic intensity in sample 98 substantially at the magnetic resonance value corresponding to the frequency of oscillator 109.

Coil 101 is energized by connection in circuit with a radio-frequency oscillator 114 which supplies an audio-frequency signal which is amplified by an audio-frequency amplifier 115 and then applied to phase-sensitive detector 116. Detector 116 supplies a bias voltage to a conventional reactance tube modulator 117, which regulates the frequency of oscillator 114 to keep this frequency substantially at the magnetic resonance value corresponding to the average magnetic intensity in sample 99.

When winding 104 is deenergized, the average magnetic intensities in samples 88 and 89 are equal, and consequently oscillators 109 and 114 operate at substantially the same radio frequency. However, when winding 104 is energized by the measured current, the magnetic intensity in sample 99 is changed by an amount proportional to this current, and the frequency of oscillator 114 also changes by an amount substantially proportional to the measured current. Thus, the difference between the respective frequencies of oscillators 109 and 114 is a substantially linear function of the measured current value.

A radio-frequency signal from oscillator 109 may be amplified by a radio-frequency amplifier 118 and then applied to a conventional mixer 119. Similarly, a radio-frequency signal from oscillator 114 may be amplified by radio-frequency amplifier 120, and this amplified signal also applied to mixer 119. Mixer 119 supplies an output signal having a frequency which is the difference between the two oscillator frequencies. This output frequency, which is substantially proportional to the measured current, may be measured by a conventional frequency meter 121.

The arrangement shown in Fig. 4 is particularly useful when the output signals are to be telemetered over a considerable distance. The radio-frequency signals from amplifiers 118 and 120 can be transmitted by wire of radio apparatus, in which case mixer 119 and frequency meter 121 are located at the receiver position of the telemetering system. Alternatively, the difference frequency output of mixer 119 can be telemetered to a remotely located frequency meter.

Figure 5:
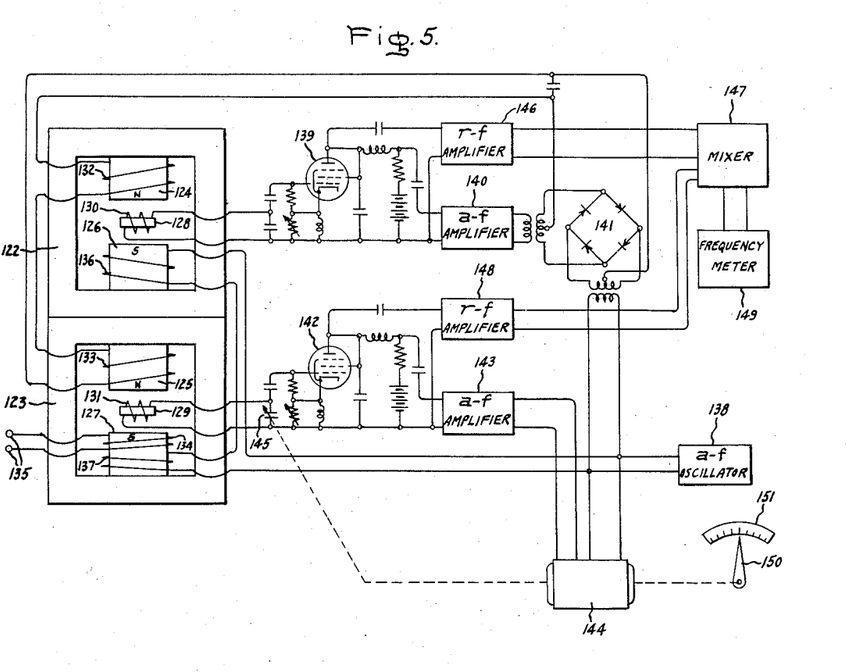
Fig. 5 is a schematic representation of still another embodiment for measuring electric current.

Fig. 5 shows another form of apparatus for measuring electric current. A magnetic structure comprises two similar parts 122 and 123 and includes permanent magnet means providing a north pole at 124 and 125 and south poles at 126 and 127. Magnetic resonance samples 128 and 129 are located in the respective gaps as shown. Coils 130 and 131 are positioned about the respective samples with the coil axes perpendicular to the magnetic fields across the gaps. Windings 132 and 133, connected in series, are arranged to provide equal changes in the magnetic intensities within the two samples. Winding 134 is arranged to change the magnetic intensity in sample 129 only, and thus to make the two magnetic intensities unequal when winding 134 is energized. The measured current is applied to winding 134 through terminals 135. Modulating windings 136 and 137 are energized at an audio frequency by suitable means such as audio-frequency oscillator 138.

Coil 130 is energized by connection in circuit with a radio-frequency oscillator 139 which supplies an audio frequency signal having a phase which depends upon whether the average magnetic intensity in sample 128 is above or below the magnetic resonance value corresponding to the frequency of oscillator 139. This signal is amplified by audio-frequency amplifier 140, and then applied to a phase-sensitive detector 141. Detector 141 supplies direct current to windings 132 and 133 to keep the average magnetic intensity in sample 128 substantially at the magnetic resonance value.

Coil 131 is energized by connection in circuit with a radio-frequency oscillator 142, which supplies an audio-frequency signal to amplifier 143 and thus to the control winding of a two-phase induction servomotor 144. The frequency of oscillator 142 is determined by the impedance of coil 131 and the value of a variable capacitor 145. Servomotor 144 automatically adjusts the value of capacitor 145 to keep the frequency of oscillator 142 substantially at the magnetic resonance value corresponding to the average magnetic intensity in sample 129.

When coil 134 is deenergized, the average magnetic intensities in samples 128 and 129 are equal, and, consequently, the frequencies of oscillators 139 and 142 are equal. However, when a measured current is applied to winding 134, the average magnetic intensity in sample 129 is not equal to that in sample 128, and, consequently, the frequency of oscillator 142 differs from that of oscillator 139. This frequency difference is substantially proportional to the value of the measured current.

To measure the frequency difference, a radio-frequency signal from oscillator 139 may be amplified by a radio frequency amplifier 146 and then applied to a conventional mixer 147. Similarly, a radio frequency signal from oscillator 142 may be amplified by radio frequency amplifier 148 and then also applied to mixer 147. Mixer 147 provides an output signal having a frequency equal to the difference between the two oscillator frequencies, which may then be measured by a conventional frequency meter 149.

In addition, or alternatively, a pointer 150 may be positioned according to the adjustment of capacitor 145, for example, by being connected to the same shaft which adjusts the capacitor. The position of pointer 150 is then a function of the value of the measured current. This may be indicated by a suitably calibrated scale 151.

Figure 6:
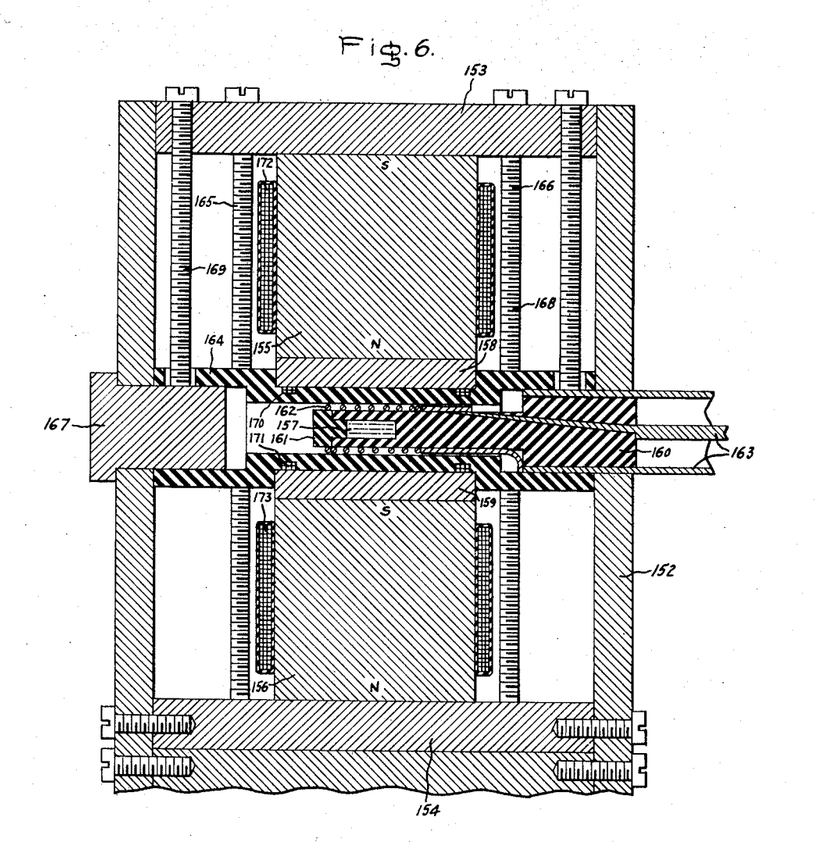
Fig. 6 is a partial section of a magnetic structure useful in my improved apparatus.

Fig. 6 shows an alternative magnetic structure which may be used with any of the forms of apparatus hereinbefore described. Only one of the two identical parts of this structure is shown. The other part is similar, and is located just below the part shown. The structure is generally cylindrical in shape, the view shown in Fig. 6 being a longitudinal cross section thereof. The entire structure is enclosed by a cylinder 152 of ferromagnetic material, which provides a return path for the magnetic fluxes and also provides magnetic shielding which reduces the effects of stray external fields. The disk-shaped members 153 and 154, respectively located at the end and near the center of cylinder 152, are also of ferromagnetic material. Within the enclosure thus formed, and coaxial with cylinder 152, there are two cylindrical permanent magnets 155 and 156. Between these two permanent magnets there is a gap within which the magnetic resonance sample 157 is located. Soft iron pole pieces 158 and 159 are preferably provided at the ends of the permanent magnets, as shown, to obtain a more homogeneous magnetic flux distribution across the gap.

The magnetic resonance sample 157 may be about 0.01 cc. of water, for example, and may also contain a small amount of a paramagnetic salt such as manganous sulphate. This sample is contained in the hollow end of a plastic rod 160, as shown, the end of which is sealed by a cap 161 cemented in place. The radio-frequency coil 162 is wound about the outside of rod 160, and is energized through coaxial cable connections 163. This assembly fits inside an opening in a plastic spacer 164 which fills the remainder of the gap between the permanent magnets. Preferably, several openings are provided in spacer 164 so that rod 160 may be inserted in various positions to test the homogeneity of the field within the gap. If the field is not sufficiently homogeneous, screws 165 and 166 can be adjusted to apply more pressure on one side of spacer 164 or the other, thereby making slight adjustments in the dimensions of the gap between the permanent magnets. To provide better shielding, the unused openings are preferably closed by plugs, such as plug 167. Rod 160 and plug 167 are held in place by screws 168 and 169 respectively.

Preferably, the modulating winding comprises a pair of annular coils 170 and 171 located at the tips of the magnet poles within annular grooves in plastic spacer 164. The other windings required may be positioned around the permanent magnets, as shown at 172 and 173.

Figure 7:
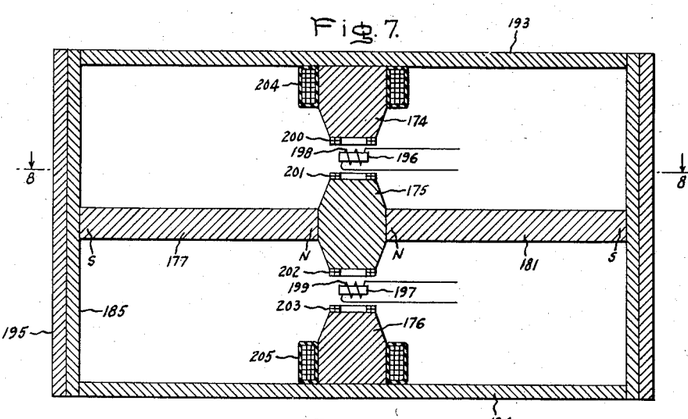
Fig. 7 is a section of an alternative magnetic structure useful in my improved apparatus.
Figure 8:
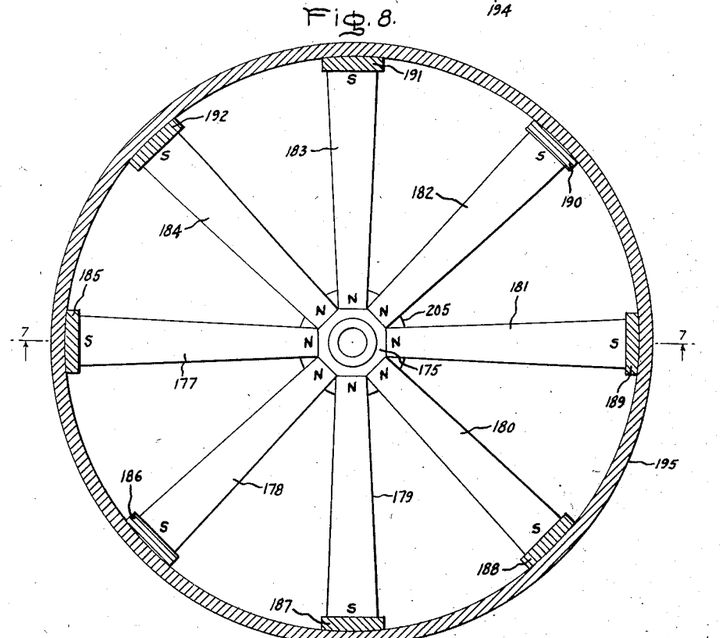
Fig. 8 is a section taken generally along the line 8—8 of Fig. 7.

Figs. 7 and 8 show another alternative magnetic structure. Three soft iron pole pieces 174, 175 and 176 are arranged in axial alignment, as shown, forming two gaps between the pole pieces. Permanent bar magnets 177, 178, 179, 180, 181, 182, 183, and 184 extend radially outward from the center pole piece 175. Soft iron strips 185, 186, 187, 188, 189, 190, 191, and 192, attached to the outer ends of the respective permanent magnets, and generally disk shaped end members 193 and 194, provide return paths for the magnetic flux from the permanent magnets, so that equal magnetic fields are provided across the two gaps between the pole pieces 174, 175, and 176. A cylindrical member 195 may be added, if desired, for magnetic shielding to minimize the effects of stray magnetic fields.

Magnetic resonance samples 196 and 197 are respectively located in the two gaps between the pole pieces. Radio-frequency coils 198 and 199 are placed about the respective samples with the coil axes perpendicular to the magnetic fields across the gaps. The modulating windings preferably are annular coils 200, 201, 202, and 203 positioned at the tips of the pole pieces as shown. Other windings needed may be placed around the pole pieces, as shown at 204 and 205.

This magnetic structure has several advantages. The respective magnetic fluxes across the two gaps can be adjusted to initial equality by adjustment of the gap lengths. With a relatively rigid center construction, gap adjustments can be provided by pressing the end plates toward the center. When once adjusted, the absolute magnitudes of the fields may vary due to the temperature coefficient of the permanent magnets or other causes, but the equality of the air gap fields is maintained to a high degree because of the common magnet system. Inhomogeneity effects in the magnets tend to average out because of the fact that there are eight separate magnets. The generally flat construction of the whole assembly tends to minimize temperature differences. The circumferential location of the permanent magnets with respect to the gaps causes the magnetic flux to enter the pole pieces near their periphery, thus tending to compensate for the inherent fringing effect of parallel face gaps and providing a larger region of uniform field. The optimum geometry is determined experimentally by varying the distance from the magnets to the gap, the taper of the poles, and the like. The magnet arrangement provides a minimum of leakage flux, and therefore a maximum effective usage of the magnetic material.

It will be understood that my invention is not limited to the specific embodiments herein illustrated and described, and that the following claims are intended to cover all changes and modifications which do not depart from the true spirit and scope of the invention.

What I claim as new and desire to secure by Letters Patent of the United States is:

1. Apparatus for measuring electrical quantities comprising a magnetic structure having at least two gaps, means responsive to the measured quantity for providing unequal magnetic intensities within said two gaps, a magnetic resonance sample within each of said two gaps, apparatus for maintaining substantial magnetic resonance in each of said samples, and means responsive to differences between the magnetic resonance frequencies of said two samples.

2. Apparatus for measuring voltage comprising a magnetic structure having at least two gaps, said structure including permanent magnet means providing substantially equal magnetic intensities within said two gaps, a first winding upon said structure arranged to change unequally when energized the average magnetic intensities in said two gaps, a resistor connected in series with said first winding, connections for applying the measured voltage across said first winding and said resistor in series, second windings arranged to change equally when energized the average magnetic intensities in said two gaps, means including third windings for modulating the magnetic intensities in said gaps at an audio frequency, magnetic resonance samples in each of said gaps, first and second coils arranged respectively about said samples and having their respective axes perpendicular to the direction of the magnetic fields across said gaps, a radio-frequency oscillator, first and second bridge circuits each energized by said oscillator, said first and second coils being connected in said first and second bridge circuits respectively so that said coils are energized to provide through said sample alternating magnetic fields at the radio frequency of said oscillator, said bridge circuits each having output connections providing radio-frequency currents which are amplitude modulated at said audio-frequency, the amplitude and phase of such modulation being related to deviations of the average magnetic intensity within the associated magnetic resonance sample from the magnetic resonance value determined by the oscillator frequency and the gyromagnetic ratio of the sample material, means for demodulating and amplifying said modulated currents to provide first and second audio-frequency error signals, a first phase-sensitive detector connected to energize said second windings in response to said first error signal to keep the average magnetic intensity within the first of said samples substantially constant at the magnetic resonance value, a second phase-sensitive detector connected to provide an output current through said resistor in response to said second error signal, whereby a voltage drop is provided across said resistor which is substantially equal and opposed to the measured voltage, and means for measuring said output current.

3. Apparatus for measuring electric current comprising a magnetic structure having at least two gaps, said structure including permanent magnet means providing substantially equal magnetic intensities within said two gaps, a first winding upon said structure arranged to change unequally when energized the average magnetic intensities in said two gaps, connections for passing the measured current through said winding, second windings arranged to change equally when energized the average magnetic intensities in said two gaps, means including third windings for varying the magnetic intensities in said gaps at an audio frequency, a permanent magnet movable relative to said structure for providing unequal magnetic intensities within said two gaps in opposition to the inequality provided in response to the measured quantity, servomotor means for adjusting the position of said movable magnet, magnetic resonance samples in each of said gaps, first and second coils arranged respectively about said samples and having their respective axes perpendicular to the direction of the magnetic fields across said gaps, a radio-frequency oscillator, first and second bridge circuits each energized by said oscillator, said first and second coils being connected in said first and second bridge circuits respectively so that said coils are energized to provide through said samples alternating magnetic fields at the radio frequency of said oscillator, said bridge circuits each having output connections providing radio-frequency currents which are amplitude modulated at said audio frequency, the amplitude and phase of such modulation being related to deviations of the average magnetic intensity within the associated magnetic resonance sample from the magnetic resonance value determined by the oscillator frequency and the gyromagnetic ratio of the sample material, means for demodulating and amplifying said modulated currents to provide first and second audio-frequency error signals, a first phase-sensitive detector connected to energize said second windings in response to said first error signal to keep the average magnetic intensity within the first of said samples substantially constant at the magnetic resonance value, and connections for operating said servomotor means in response to said second error signal for automatically adjusting the position of said movable magnet to keep the average magnetic intensity within the second of said samples substantially constant at the magnetic resonance value.

4. In combination, a magnetic structure comprising three axially aligned parts having first and second gaps therebetween, a plurality of permanent bar magnets extending radially outward from the center one of said three parts, means providing magnetic paths from the outer ends of said magnets to the two outer ones of said three parts, thereby providing magnetic fields across said two gaps, windings about respective ones of said parts for changing the magnetic field across at least one of said gaps, a first magnetic resonance sample in said first gap, a second magnetic resonance sample in said second gap, first and second coils positioned about said first and second samples respectively having their axes perpendicular to the magnetic fields across the respective gaps, and means energizing said coils at frequencies required for magnetic resonance in said samples.

5. Apparatus for measuring electrical quantities comprising a magnetic structure having at least two gaps, means providing substantially equal magnetic intensities within said two gaps, means responsive to the measured quantity for providing unequal magnetic intensities within said two gaps, the inequality of said magnetic intensities being a function of said measured quantity, a magnetic resonance sample within each of said gaps, apparatus for maintaining substantial magnetic resonance in each of said samples, said apparatus functioning to establish an electrical signal related in value to the magnitude of the inequality of said magnetic intensities whereby the magnitude of said signal is related in value to the magnitude of said measured quantity, and means for measuring said signal.

6. Apparatus for measuring electrical quantities comprising a magnetic structure having at least two gaps, means including permanent magnet means providing substantially equal magnetic intensities within said two gaps, means responsive to the measured quantity for providing unequal magnetic intensities within said two gaps functionally related to the measured quantity, a magnetic resonance sample within each of said gaps, apparatus for maintaining substantial magnetic resonance in each of said samples, said apparatus functioning to establish an electrical signal related in value to the magnitude of the inequality of said magnetic intensities whereby the magnitude of said signal is related in value to the magnitude of said measured quantity, and means for measuring said signal.

7. Apparatus for measuring voltage comprising a magnetic structure having at least two gaps, a winding arranged to provide when energized unequal magnetic intensities within said two gaps, an impedance element connected in series with said winding, connections for applying the measured voltage across said winding and said impedance element in series, a magnetic resonance sample within each of said gaps, and apparatus for maintaining substantial magnetic resonance in each of said samples, said apparatus functioning to provide a current through said impedance element in response to such inequalities of the magnetic intensities whereby a voltage drop is provided across said impedance element which is substantially equal and opposed to the measured voltage, thereby providing a current proportional to the measured voltage.

8. Apparatus for measuring voltage comprising a magnetic structure having at least two gaps, said structure including permanent magnet means providing substantially equal magnetic intensities within said two gaps, a winding upon said structure arranged to change when energized the magnetic intensity in at least one of said gaps thereby making the two magnetic intensities unequal, a resistor connected in series with said winding, connections for applying the measured voltage across said winding and said resistor in series, a magnetic resonance sample within each of said gaps, and apparatus for maintaining substantial magnetic resonance in each of said samples, said apparatus functioning to provide a current through said resistor in response to such inequalities of the magnetic intensities whereby a voltage drop is provided across said resistor which is substantially equal and opposed to the measured voltage, thereby providing a current proportional to the measured voltage.

9. Apparatus for measuring electrical quantities comprising two similar magnetic circuits each having a gap, a magnetic resonance sample within each of said gaps, first apparatus for maintaining substantial magnetic resonance in one of said samples, said first apparatus functioning to supply equal magnetizing forces to said two magnetic circuits and functioning to maintain the average magnetic intensity in its corresponding gap substantially constant, means responsive to the measured quantity for changing the magnetic intensity in the second of said gaps being a function of said measured quantity, and a second apparatus for maintaining substantial magnetic resonance of the other of said samples, said second apparatus functioning to establish on electrical signal related in value to the change in magnetic intensity in said second gap whereby the magnitude of said signal is related in value to the magnitude of said measured quantity.

10. Apparatus for measuring voltage comprising a magnetic structure having at least two gaps, said structure including permanent magnet means providing substantially equal magnetic intensities within said two gaps, a first winding arranged to change unequally when energized the average magnetic intensities in said two gaps, a resistor connected in series with said first winding, connections for applying the measured voltage across said first winding and said resistor in series, second windings arranged to change equally when energized the average magnetic intensities in said two gaps, a magnetic resonance sample within each of said gaps, first apparatus for maintaining substantial magnetic resonance in one of said samples, said first apparatus functioning to energize said second windings to keep the average magnetic intensity in its corresponding gap substantially constant, and second apparatus for maintaining substantial magnetic resonance in the other of said samples, said second apparatus functioning to supply current through said resistor to keep the average magnetic intensity in its corresponding gap substantially constant whereby a voltage drop is provided across said resistor which substantially equals and opposes the measured voltage, thereby providing a current proportional to the measured voltage.

11. Apparatus for measuring electrical quantities comprising a magnetic structure having at least two gaps, means providing substantially equal magnetic intensities within said two gaps, means responsive to the measured quantity for providing unequal magnetic intensities within said two gaps, a permanent magnet movable relative to said structure for providing unequal magnetic intensities within said two gaps in opposition to the inequality provided in response to the measured quantity, a magnetic resonance sample within each of said gaps, and apparatus for maintaining substantial magnetic resonance in each of said samples, said apparatus including means for automatically adjusting the position of said magnet in response to the net inequality of the magnetic intensities to keep such magnetic intensities substantially equal whereby the magnet position is related to the value of the measured quantity.

12. Apparatus for measuring electrical quantities comprising a magnetic structure having at least two gaps, means providing substantially equal magnetic intensities within said two gaps, a winding arranged to provide when energized unequal magnetic intensities within said two gaps, means for energizing said winding in response to the measured quantity, a magnet movable relative to said structure for providing unequal magnetic intensities within said two gaps in opposition to the inequality provided in response to the measured quantity, a magnetic resonance sample within each of said gaps, first apparatus for maintaining substantial magnetic resonance in one of said samples, said first apparatus functioning to keep the average magnetic intensity in its corresponding gap substantially constant and second apparatus for maintaining substantial magnetic resonance in the other of said samples, said second apparatus including a servo motor for adjusting the position of said magnet to keep the average magnetic intensity in its corresponding gap substantially constant.

13. Apparatus for measuring electrical quantities comprising a magnetic structure having at least two gaps, means providing substantially equal magnetic intensities within said two gaps, means responsive to the measured quantity for providing unequal magnetic intensities within said two gaps, a first magnet movable relative to said structure for changing the magnetic intensity within the first of said gaps, a second magnet movable relative to said structure for changing the magnetic intensity within the second of said gaps, a magnetic resonance sample within each of said gaps, first apparatus for maintaining substantial magnetic resonance in said sample within said first gap including means for automatically adjusting the position of said first magnet to keep the magnetic intensity in said gap substantially constant, and second apparatus for maintaining substantial magnetic resonance in said sample within said second gap including means for automatically adjusting the position of said second magnet to keep the magnetic intensity in said second gap substantially constant, the difference in the respective positions of said two magnets being related to the measured quantity, and means for determining said difference in respective positions as a function of the measured quantity.

14. Apparatus for measuring electric current comprising a magnetic structure having at least two gaps, said structure including permanent magnet means providing substantially equal magnetic intensities within said two gaps, a first winding arranged to increase when energized the magnetic intensity in the first of said gaps, a second winding arranged to decrease when energized the magnetic intensity in the second of said gaps, connections for passing the measured current through said first and second windings in series, a first movable permanent magnet for changing the magnetic intensity within said first gap, a second movable permanent magnet for changing the magnetic intensity within said second gap, first and second servo-motor means for adjusting the positions of said first and second movable magnets respectively, a magnetic resonance sample within each of said gaps, first apparatus for maintaining substantial magnetic resonance in said sample within said first gap including means for controlling said first servo-motor means to keep the magnetic intensity within said first gap substantially constant, second apparatus for maintaining substantial magnetic resonance in said sample within said second gap including means for controlling said second servo-motor means to keep the magnetic intensity within said second gap substantially constant, and differential means providing an indication of the difference in the respective positions of said movable magnets.

15. Apparatus for measuring electrical quantities comprising a magnetic structure having at least two gaps, means providing substantially equal magnetic intensities within said two gaps, means responsive to the measured quantity for providing unequal magnetic intensities within said two gaps, a magnetic resonance sample within each of said gaps, first apparatus for maintaining substantial magnetic resonance in said sample within the first of said gaps, said first apparatus functioning to supply a first electric signal having a frequency proportional to the magnetic intensity in said first gap, second apparatus for maintaining substantial magnetic resonance in said sample within the second of said gaps, said second apparatus functioning to supply a second electric signal having a frequency proportional to the magnetic intensity in said second gap, and means for measuring the difference between the frequency of said first signal and the frequency of said second signal, said difference being related in value to the magnitude of said measured quantity.

16. Apparatus for measuring electrical quantities comprising a magnetic structure having at least two gaps, a magnetic resonance sample within each of said gaps, first apparatus for maintaining substantial magnetic resonance in the sample within the first of said gaps including means for changing the respective magnetic intensities in said two gaps by equal amounts to keep the average magnetic intensity in said first gap substantially constant, means responsive to the measured quantity for changing the magnetic intensity in the second of said gaps by an amount functionally related to the magnitude of said measured quantity, and second apparatus for maintaining substantial magnetic resonance in the sample within said second gap and functioning to supply an electric signal having a frequency proportional to the magnetic intensity in said second gap.

17. Apparatus for measuring electrical quantities comprising a magnetic structure having at least two gaps, said structure including permanent magnet means providing substantially equal magnetic intensities within said two gaps, a first winding arranged to change unequally when energized the average magnetic intensities in said two gaps, second windings arranged to change equally when energized the average magnetic intensities in said two gaps, means energizing said first winding in accordance with the measured quantity first apparatus for maintaining substantial magnetic resonance in the sample within the first of said gaps including means for keeping the average magnetic intensity in said first gap substantially constant, and second apparatus for maintaining substantial magnetic resonance in the sample within the second of said gaps and functioning to supply an electric signal having a frequency proportional to the average magnetic intensity in said second gap.

18. Apparatus for measuring electrical quantities comprising a magnetic structure having at least two gaps, means responsive to the measured quantity for providing unequal magnetic intensities within said two gaps, a magnetic resonance sample within each of said gaps, first apparatus for maintaining substantial magnetic resonance in the sample within the first of said gaps, said first apparatus functioning to keep the average magnetic intensity in said first gap substantially constant, and second apparatus for maintaining substantial magnetic resonance in the sample within the second of said gaps, said second apparatus including a coil arranged about said sample in said second gap having its axis perpendicular to the magnetic field across said second gap, oscillator means energizing said coil, and reactance to means regulating the frequency of said oscillator means to keep said frequency substantially at the magnetic resonance value of said sample in said second gap.

19. Apparatus for measuring electrical quantities comprising a magnetic structure having at least two gaps, means responsive to the measured quantity for providing unequal magnetic intensities within said two gaps, a magnetic resonance sample within each of said gaps, first apparatus for maintaining substantial magnetic resonance in the sample within the first of said gaps, said first apparatus functioning to keep the average magnetic intensity in said first gap substantially constant, second apparatus for maintaining substantial magnetic resonance in the sample within the second of said gaps, said second apparatus including a coil arranged about the sample in said second gap having its axis perpendicular to the magnetic field across said second gap, oscillator means energizing said coil, a variable capacitor regulating the frequency of said oscillator means, and servo-motor means automatically adjusting said capacitor to keep the oscillator frequency at the magnetic resonance value of the sample in said second gap.

20. In combination, a magnetic structure comprising three axially aligned parts having first and second gaps therebetween, a permanent magnet extending radially outward from the center one of said three parts, means providing magnetic paths from the outer ends of said magnet to the two outer ones of said three parts, a magnetic resonance sample within each of said gaps, first apparatus for maintaining substantial magnetic resonance in the sample within said first gap, and second apparatus for maintaining substantial magnetic resonance in the sample within said second gap, said first and second apparatus responding respectively to the magnetic intensity in corresponding air gaps.

References Cited in the file of this patent

UNITED STATES PATENTS

| | | |
|---|---|---|
| 716,103 | Read | Dec. 16, 1902 |
| 2,409,866 | Jewell | Oct. 22, 1946 |
| 2,427,571 | Pattee | Sept. 16, 1947 |
| 2,468,576 | Teare | Apr. 26, 1949 |
| 2,545,369 | Millar | Mar. 13, 1951 |
| 2,551,265 | Hansen | May 1, 1951 |
| 2,555,131 | Hershberger | May 29, 1951 |
| 2,560,257 | Sias | July 10, 1951 |
| 2,561,489 | Bloch et al. | July 24, 1951 |
| 2,589,494 | Hershberger | Mar. 18, 1952 |
| 2,647,239 | Tellegen | July 28, 1953 |
| 2,743,366 | Hershberger | Apr. 24, 1956 |
| 2,764,676 | Bradley | Sept. 25, 1956 |

OTHER REFERENCES

Knoebel et al.: The Review of Scientific Instruments, vol. 22, No. 12, December 1951, pp. 904–911.